(12) United States Patent
Eriksson

(10) Patent No.: US 10,981,431 B2
(45) Date of Patent: Apr. 20, 2021

(54) ASSEMBLY FOR ROUTING COOLING CONDUITS THROUGH A VEHICLE

(71) Applicant: Volvo Car Corporation, Göthenburg (SE)

(72) Inventor: Göran Eriksson, Nödinge (SE)

(73) Assignee: Volvo Car Corporation, Göteborg (SE)

( * ) Notice: Subject to any disclaimer, the term of this patent is extended or adjusted under 35 U.S.C. 154(b) by 70 days.

(21) Appl. No.: 16/412,757

(22) Filed: May 15, 2019

(65) Prior Publication Data

US 2019/0389275 A1 Dec. 26, 2019

Related U.S. Application Data

(60) Provisional application No. 62/689,988, filed on Jun. 26, 2018.

(51) Int. Cl.
*B60H 1/00* (2006.01)
*B60K 11/02* (2006.01)
(Continued)

(52) U.S. Cl.
CPC ..... *B60H 1/00271* (2013.01); *B60H 1/00564* (2013.01); *B60K 11/02* (2013.01); *B60H 2001/00614* (2013.01); *B60Y 2306/05* (2013.01); *B62D 25/04* (2013.01); *G05D 1/021* (2013.01); *G05D 1/0231* (2013.01); *G05D 1/0257* (2013.01); *G05D 2201/0213* (2013.01)

(58) Field of Classification Search
CPC .. B60H 1/00271; B60H 1/00; B60H 1/00814; B60H 1/00257; B60H 1/00564; B60H 2001/00614; B60H 1/00207; B60H 1/00571; B60H 2001/00307; B60H 2001/00235; B60K 11/02; B60K 2001/005; B62D 25/04; G05D 1/0231; G05D 1/0257; G05D 2201/0213; G05D 1/021; B60Y 2306/05; F01P 7/14; F28D 1/0408

See application file for complete search history.

(56) References Cited

U.S. PATENT DOCUMENTS 9,509,357 B2 11/2016 Marshall
10,131,201 B1 * 11/2018 Yeomans ........... B60H 1/00821
(Continued)

*Primary Examiner* — Emmanuel E Duke
(74) *Attorney, Agent, or Firm* — Clements Bernard Walker; Christopher L. Bernard

(57) ABSTRACT

Heat exchangers, such as radiators, condensers, or other cooling systems, are provided in the present disclosure. Heat exchanging systems may include an assembly for routing cooling conduits from the heat exchanger, along or through one or more A-pillars of the vehicle, and to a rooftop electronics assembly, which may be used for performing self-driving functions when the vehicle is configured as an autonomous vehicle or the like. The conduit routing assembly enhances manufacturing efficiency and cost effectiveness as compared to conventional assemblies. According to one embodiment of the present disclosure, an assembly for cooling a rooftop electronics assembly of a vehicle may include one or more conduits configured to transport a cooling fluid between an in-vehicle cooling system and the rooftop electronics assembly, wherein the one or more conduits are disposed partially along an A-pillar of the vehicle.

20 Claims, 4 Drawing Sheets

(51) Int. Cl.
  *B62D 25/04*      (2006.01)
  *G05D 1/02*       (2020.01)

(56)         References Cited

U.S. PATENT DOCUMENTS

2006/0000429 A1*  1/2006  Stone ................. F28D 1/04
                                                    123/41.49
2012/0193067 A1   8/2012  Miller
2014/0209269 A1*  7/2014  Goenka ............. B60H 1/32281
                                                    165/42
2014/0284043 A1*  9/2014  Arai ................. H01M 10/6551
                                                    165/287
2016/0200165 A1*  7/2016  France ................. H01L 23/36
                                                    165/51
2017/0072786 A1*  3/2017  Kurokawa .......... B60R 13/0876
2018/0220555 A1*  8/2018  Schmidt ............ H05K 7/20272
2018/0370324 A1* 12/2018  Zhou ................. B60H 1/00885
2019/0003098 A1   1/2019  Zeigler et al.
2019/0011186 A1   4/2019  Dede
2019/0160917 A1*  5/2019  Kim .................. B60H 1/00271

* cited by examiner

ASSEMBLY FOR ROUTING COOLING CONDUITS THROUGH A VEHICLE

CROSS-REFERENCE TO RELATED APPLICATION

The present disclosure claims the benefit of priority of U.S. Provisional Patent Application No. 62/689,988, filed on Jun. 26, 2018, and entitled "ASSEMBLY AND METHOD FOR ROUTING COOLING CONDUITS TO A ROOFTOP ELECTRONICS ASSEMBLY OF A VEHICLE," the contents of which are incorporated in full by reference herein.

TECHNICAL FIELD

The present disclosure relates generally to the automotive field. More specifically, the present disclosure relates to heat exchangers of a vehicle and assemblies for routing cooling conduits of heat exchangers through the vehicle, particularly for cooling autonomous-driving or self-driving electronics assemblies installed on the roof of the vehicle.

BACKGROUND

Autonomous vehicles, also known as self-driving vehicles and the like, utilize a wide array of electronic systems and components. These electronic systems and components may include, but are not limited to, Global Positioning Systems (GPSs), inertial guidance systems (e.g., accelerometers, gyroscopes, etc.) providing linear and rotational motion information, video cameras, Light Detection And Ranging (LiDAR) systems, radar systems, and other various systems and components.

Automobile manufacturing companies have recently begun incorporating the autonomous-driving equipment into the design of vehicles. However, for the most part, autonomous equipment is typically manufactured separately from the manufacturing process of the vehicle itself and is retrofitted to the existing vehicles. Often, the electronic systems and components for conducting self-driving capabilities are housed in an electronics housing or pod that is installed on the rooftop of the vehicle, both saving in-vehicle space and providing required device visibility.

The video cameras of the self-driving systems may provide a visual 360-degree perspective and/or a bird's eye view (BEV) of the environment surrounding the vehicle. This allows travel lanes and markers to be identified, objects to be detected, etc. However, video cameras may suffer from a number of disadvantages. For example, it may be difficult to properly position video cameras in or on the electronics housing and to keep the video cameras adequately clean, which can compromise the sensing views. Also, video cameras may require intensive computational processing to fully exploit the video information that is obtained and may further lack some of the desired depth perception capabilities needed to properly analyze the environment.

Thus, self-driving functions may rely more heavily on LiDAR systems. LiDAR systems provide rapid and accurate three-dimensional (3-D) assessment of the environment surrounding the vehicle, especially at farther distances. Also, LiDAR systems may more effectively identify objects, determine motion vectors, predict collisions, and implement collision avoidance actions. These LiDAR systems may include solid state scanning and/or rotating systems and may utilize laser pulses that are timed with the responses of associated detectors to provide range and motion information. In short-distance applications, where LiDAR systems are not as effective, radar systems operating at approved frequencies may be relied upon to provide desirable radio frequency (RF) propagation characteristics and resolution.

All of these electronic systems and components generate a great deal of heat during operation and furthermore, because of their positioning on top of vehicles, may also absorb a great deal of heat from the sun. Therefore, these systems, like most electrical components, must be cooled to within an acceptable temperature range in order to operate properly. Otherwise, the systems may overheat, which can cause damage to or failure of these electronics. The process of cooling this equipment may involve air (i.e., convection) cooling when the vehicle is in motion. However, air cooling may not typically cool these components below an acceptable temperature maximum tolerance for proper operation. Some conventional systems may use dedicated cooling systems installed within the electronics housing itself and/or may include complex conduit networks linking common cooling systems to the electronic systems and components.

However, the conventional cooling systems can be inefficient and cost prohibitive when dealing with rooftop electronics housings or pods, for example. Thus, what is still needed in the art is an assembly for routing cooling conduits to rooftop housings or pods, such as housings for electronic systems for providing self-driving or autonomous-driving sensing, analyzing, and controlling functions. Such cooling of rooftop electronics housings may therefore be conducted in order that the electronic systems and components disposed therein may be adequately cooled for proper operation.

SUMMARY

In various aspects, the present disclosure provides an assembly and method for routing cooling conduits from a radiator or other in-vehicle cooling system of a vehicle, along/through the A-pillar of the roof, and to the rooftop electronics assembly of the vehicle, wherein the vehicle is an autonomous vehicle or the like. This assembly and method enhances manufacturing efficiency and cost effectiveness as compared to conventional assemblies and methods. The cooling conduits are run through the A-pillar coincident with the sunroof drains already disposed therein, when applicable. The entire assembly also preferably forms an independent cooling loop, such that it is not disturbed by work done on other conventional cooling systems, such as battery cooling systems and the like.

In one specific aspect, the present disclosure provides an assembly for cooling a rooftop electronics assembly of a vehicle, the assembly including one or more conduits configured to transport a cooling fluid between an in-vehicle cooling system and the rooftop electronics assembly. The one or more conduits may be disposed at least partially along an A-pillar of the vehicle. Optionally, the assembly may further include a pump fluidly coupled to the one or more conduits and operable for transporting the cooling fluid between the in-vehicle cooling system and the rooftop electronics assembly. Optionally, the assembly may further include an electronics cooler coupled to the one or more conduits, disposed adjacent to or within the rooftop electronics assembly, and operable for transferring heat away from the rooftop electronics assembly using the cooling fluid. The one or more conduits may include a delivery conduit configured to deliver cooled cooling fluid from the in-vehicle cooling system to the rooftop electronics assembly and a return conduit configured to deliver heated cooling fluid from the rooftop electronics assembly to the in-vehicle cooling system. The in-vehicle cooling system may include a radiator disposed in an engine or motor compartment of the vehicle.

In a further specific aspect, the present disclosure provides a vehicle including a cooling assembly for cooling a rooftop electronics assembly of the vehicle, the cooling assembly including one or more conduits configured to transport a cooling fluid between an in-vehicle cooling system of the vehicle and the rooftop electronics assembly, wherein the one or more conduits may be disposed partially along an A-pillar of the vehicle. Optionally, the cooling assembly may further include a pump fluidly coupled to the one or more conduits and operable for transporting the cooling fluid between the in-vehicle cooling system and the rooftop electronics assembly. Optionally, the cooling assembly further includes an electronics cooler coupled to the one or more conduits, disposed adjacent to or within the rooftop electronics assembly, and operable for transferring heat away from the rooftop electronics assembly using the cooling fluid. The one or more conduits may include a delivery conduit configured to deliver cooled cooling fluid from the in-vehicle cooling system to the rooftop electronics assembly and a return conduit configured to deliver heated cooling fluid from the rooftop electronics assembly to the in-vehicle cooling system. The in-vehicle cooling system may include a radiator disposed in an engine or motor compartment of the vehicle.

In yet another specific aspect, the present disclosure provides a cooling system of a vehicle. The cooling system may include a heat exchanger in fluid communication with a coolant supply conduit and a coolant return conduit and may include a conduit routing assembly configured to route the coolant supply conduit and coolant return conduit through one or more A-pillars of the vehicle for transporting cooling fluid between the heat exchanger and a rooftop electronics assembly mounted on the roof of the vehicle. Optionally, the heat exchanger may include a radiator. The radiator may be further configured to cool one or more of an internal combustion engine and a battery pack. According to another option, the heat exchanger may include an air conditioning system. The air conditioning system may be further configured to cool a passenger cabin of the vehicle. The coolant supply conduit may be arranged in a first A-pillar of the one or more A-pillars and the coolant return conduit may be arranged in a second A-pillar of the one or more A-pillars. The coolant supply conduit and coolant return conduit may alternatively be arranged in a single A-pillar of the one or more A-pillars. The coolant supply conduit may be configured to branch into a first conduit and a second conduit, the first conduit leading to a primary device to be cooled by the heat exchanger and the second conduit leading to the rooftop electronics assembly. The coolant return conduit may be configured to branch into a third conduit and a fourth conduit, the third conduit leading from the rooftop electronics assembly to the heat exchanger and the fourth conduit leading from the primary device to the heat exchanger. For example, the primary device may be one or more of an internal combustion engine, a battery pack, and a passenger cabin. Optionally, the coolant supply conduit may lead to the rooftop electronics assembly and the coolant return conduit may pass from the rooftop electronics assembly through a primary device to the heat exchanger, wherein the primary device may be one or more of an internal combustion engine, a battery pack, and a passenger cabin. The rooftop electronics assembly may include equipment for sensing information related to an environment around the vehicle, and wherein the information is used to enable the vehicle to perform self-driving actions.

BRIEF DESCRIPTION OF THE DRAWINGS

The present disclosure is illustrated and described herein with reference to the drawings, not necessarily drawn to scale, in which.

DESCRIPTION OF EMBODIMENTS

In various aspects, the present disclosure provides heat exchangers and related heating/cooling systems (e.g., radiators, air conditioning systems, etc.) for cooling an internal combustion engine, battery pack, passenger cabin, self-driving electronics components, and other components, systems, or spaces of a vehicle. According to the teachings of the present disclosure, the heating/cooling systems include a conduit routing assembly for routing cooling conduits from the heat exchanger (e.g., radiator) of the vehicle to a rooftop electronics assembly of the vehicle, whereby the vehicle may be configured as an autonomous vehicle or the like and the rooftop electronics assembly may be used for performing various sensing and controlling functions related to autonomous driving. More specifically, the conduit routing assembly may include routing the cooling conduits along or through one or both of the A-pillars of the vehicle, where the A-pillars include the metal frame components for holding the sides of the front windshield of the vehicle and are further utilized for protecting passengers in the event of an accident.

The conduit routing assemblies of the present disclosure may enhance manufacturing efficiency and may be more cost effective as compared to conventional assemblies for cooling rooftop electronics assemblies when installed onto a vehicle. The cooling conduits may be run through one or both of the A-pillars coincident with sunroof drains already disposed therein, when applicable. The conduit routing assembly may also form an independent cooling loop, such that it operates independently of other conventional cooling systems and/or does not disturb or is not disturbed by the operation of other conventional cooling systems.

Figure 1:
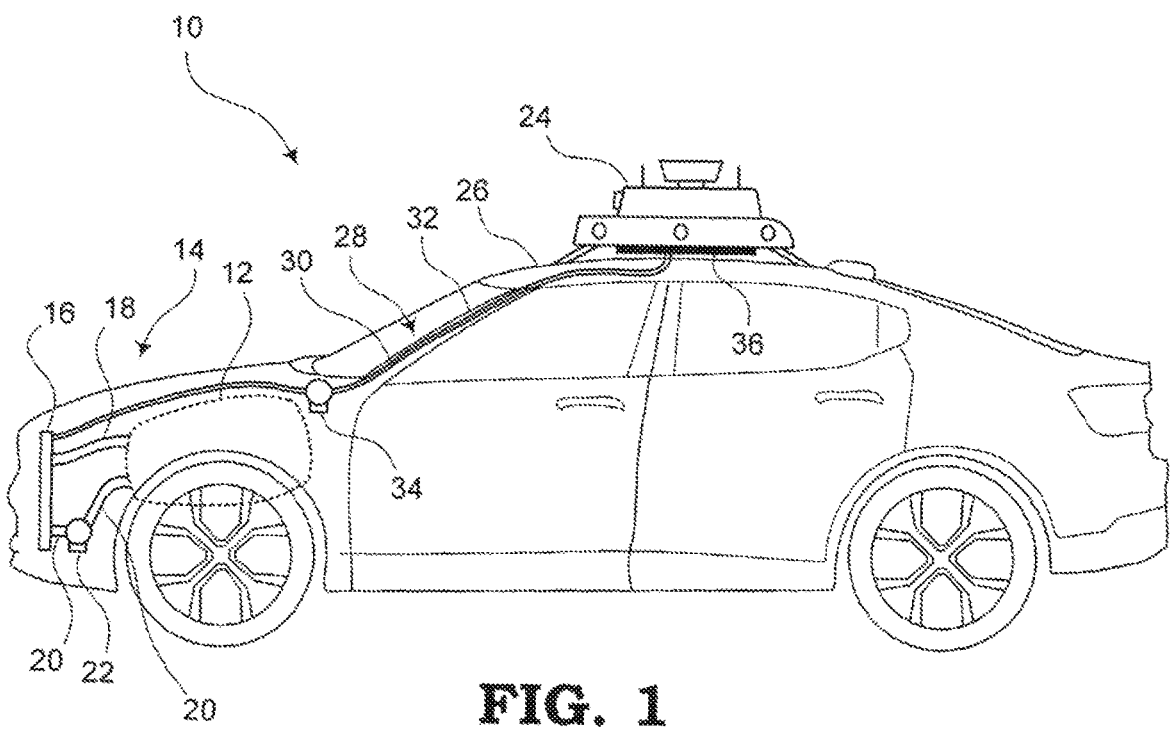
FIG. 1 is a schematic diagram illustrating a side view of a vehicle including a conduit routing assembly for routing cooling conduits from a radiator, used for cooling an internal combustion engine, to a rooftop electronics assembly of the vehicle, in accordance with various embodiments of the present disclosure.

FIG. 1 shows a side view of an embodiment of a vehicle 10 that is driven by an internal combustion engine 12 or other suitable type of motor. In this embodiment, a heat exchanger 14 (or cooling assembly) utilizes a radiator 16 in a typical manner for cooling the internal combustion engine 12. For example, liquid coolant (not shown), which is cooled in the radiator 16, is supplied to the internal combustion engine 12 through a first set of radiator hoses 18. Heat is transferred from the engine block of the engine 12 to the coolant circulating throughout the engine block and the heated coolant returns to the radiator 16 through a set of additional radiator hoses 20 via a pump 22. In some embodiments, the pump 22 (or an additional pump) may alternatively be installed in-line with the first set of radiator hoses 18.

In addition, the heat exchanger 14 utilizing the radiator 16 may further be configured to cool electronic components of a rooftop electronics assembly 24 mounted on a roof 26 of the vehicle 10. The rooftop electronics assembly 24, for example, may include self-driving or autonomous systems or components. For instance, autonomous systems may include LiDAR, radar, cameras, etc. for monitoring the roads, traffic lanes, curbs, intersections, other vehicles, pedestrians, etc. surrounding the vehicle 10 to allow self-driving of the vehicle 10 with little or no control required by a human driver. The heat exchanger 14 may include a conduit routing assembly 28 configured for routing cooling conduits 30 from the radiator 16 to the rooftop electronics assembly 24. As described with respect to FIGS. 5-8, the conduit routing assembly 28 may be configured in a variety of ways.

In one aspect, the vehicle 10 and heat exchanger 14 may include one or more conduits 30 configured to transport a cooling fluid (e.g., coolant) directly or indirectly between the radiator 16 of the vehicle 10 and the rooftop electronics assembly 24. Preferably, the one or more conduits 30 may include one or more substantially flexible cooling lines forming an independent cooling loop disposed at least partially along and/or through one or more A-pillars 32 of the vehicle 10. In this configuration, the one or more conduits 30 can optionally be routed partially coincident with drain lines (not shown) of the A-pillars 32 from a sunroof (not shown) and/or other wiring. Placing the conduits 30 along or through the A-pillars 32 may promote manufacturing efficiency and cost effectiveness.

By way of example only, the one or more conduits 30 may include a nylon (e.g., polyamide) and/or stainless steel hose having an outside diameter (OD) of about 11.5 mm. The conduits 30 may be pre-shaped to enable packaging in the A-pillar 32 and may be routed between a firewall and firewall insulation and along the roof 26 of the vehicle 10. For example, the conduits 30 may further be configured to deliver a flow of about 2.5-3.0 liters per minute, when the roof 26 reaches a temperature of up to about 40 degrees C. The one or more conduits 30 may also be insulated in the A-pillar 32, if necessary, as this area may typically be exposed to a great deal of heat from sunlight. A conventional sunroof drain hose package in the A-pillar 32 is typically 14.5 mm OD, so about 1.5 mm of insulation can readily be added to the one or more conduits 30 without compromising current packaging constraints.

The heat exchanger 14 may be a cooling system for otherwise cooling the engine 12 or for cooling other components, such as a motor or other power generating devices, powertrains, etc. The radiator 16 may include fins, cooling coils, and other elements exposed to an external air flow and may further be cooled by one or more fans (not shown) for displacing heat by a convection process.

The heat exchanger 14, or cooling system, may also include an additional pump 34 fluidly coupled to one or both of the conduits 30 and may be operable for transporting the cooling fluid between the radiator 16 and the rooftop electronics assembly 24. The cooling assembly 14 may also include a chiller (not shown) that further cools the cooling fluid (e.g., coolant) via an air conditioning system, when necessary.

The heat exchanger 14, or cooling system, may further include an electronics cooler 36 coupled to the one or more conduits 30 and disposed adjacent to or within the rooftop electronics assembly 24. The electronics cooler 36 may be operable for transferring heat away from the rooftop electronics assembly 24 using the cooling fluid or by other means. The electronics cooler 36 may be a heat exchanger, or the like. For example, the one or more conduits 30 may simply terminate at the electronics cooler 36, which may already be thermally coupled to the rooftop electronics assembly 24. The electronics cooler 36 and rooftop electronics assembly 24 may form a pre-assembled rooftop electronics housing or pod.

Preferably, the one or more conduits 30 may include both a delivery conduit configured to deliver cooled cooling fluid from the radiator 16 to the rooftop electronics assembly 24 and a return conduit configured to deliver heated cooling fluid from the rooftop electronics assembly 24 back to the radiator 16. Thus, the cooling fluid is continuously circulated to and from the rooftop electronics assembly 24, being continuously cooled by the radiator 16.

Figure 2:
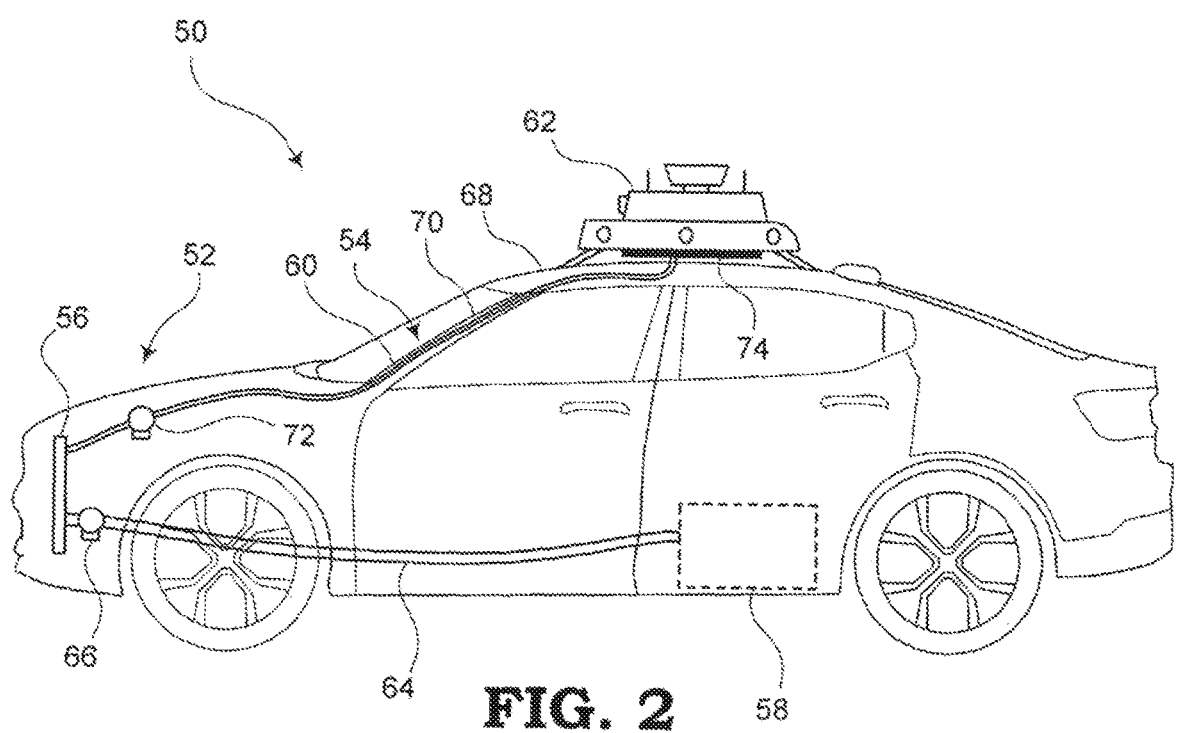
FIG. 2 is a schematic diagram illustrating a side view of an electric vehicle including a conduit routing assembly for routing cooling conduits from a radiator, used for cooling a battery pack for driving the electric vehicle, to a rooftop electronics assembly of the electric vehicle, in accordance with various embodiments of the present disclosure.

FIG. 2 is a diagram illustrating a side view of an embodiment of an electric vehicle 50 including a heat exchanger 52 (or cooling assembly), which may be similar to the heat exchanger 14 described with respect to FIG. 1 and may include many of the same components. In this embodiment, a conduit routing assembly 54 may be configured for routing cooling conduits from a radiator 56, which may be normally used for cooling a battery pack 58 or other battery system for driving the electric vehicle 50. For example, in this embodiment, the conduit routing assembly 54 may be further configured to route cooling conduits 60 to a rooftop electronics assembly 62 of the electric vehicle 50.

In this embodiment, the heat exchanger 52 utilizes the radiator 56 in a typical manner for cooling the battery pack 58. For example, liquid coolant (not shown), which is cooled in the radiator 56, is supplied to the battery pack 58 through a hoses or conduits 64, which may include one or more outgoing conduits and one or more incoming conduits. Heat is transferred from the battery pack 58 to the coolant circulating throughout the battery pack 58 and the coolant returns to the radiator 56. A pump 66 may be installed on the outgoing or incoming conduits for forcing the coolant through the conduits 64.

In addition to its conventional use in which the heat exchanger 52 utilizes the radiator 56 to cool the battery pack 58 of the electric vehicle 50, the heat exchanger 52 is further configured to cool electronic components of the rooftop electronics assembly 62 mounted on a roof 68 of the vehicle 50. As mentioned above, the rooftop electronics assembly 62, for example, may include self-driving or autonomous systems or components, such as LiDAR, radar, cameras, and other suitable components.

Again, the conduits 60 may include one or more conduits configured for transporting the cooling fluid (e.g., coolant) between the radiator 56 and the rooftop electronics assembly 62, whereby the heat exchanger 52 may normally be a cooling system for otherwise cooling the battery pack 58 or for cooling other electrical power generating components for driving the electric vehicle 50. The radiator 56 may include fins, coils, etc. exposed to ambient air and may further be cooled by one or more fans.

Preferably, the one or more conduits 60 may include one or more substantially flexible cooling lines forming an independent cooling loop disposed partially along/through one or more A-pillars 70 of the vehicle 50. In this configuration, the one or more conduits 60 can optionally be routed partially coincident with drain lines (not shown) of the A-pillars 70 from a sunroof (not shown) and/or other wiring.

As mentioned above, the one or more conduits 60 may include a nylon (e.g., polyamide) and/or stainless steel hose having an outside diameter of approximately 11.5 mm. The conduits 60 may be pre-shaped to enable packaging in the A-pillar 70 and may be routed between a firewall and firewall insulation and along the roof 68 of the vehicle 50. For example, the conduits 60 may further be configured to deliver a flow of about 2.5-3.0 liters per minute, when the roof 68 reaches a temperature of up to about 40 degrees C. The one or more conduits 60 may also be insulated in the A-pillar 70, if necessary.

The heat exchanger 52, or cooling assembly, may also include an additional pump 72 fluidly coupled to the one or more conduits 60 and may be operable for transporting the cooling fluid between the radiator 56 and the rooftop electronics assembly 62. The heat exchanger 52 may also include a chiller (not shown) that further cools the cooling fluid via an air conditioning system, when necessary.

The heat exchanger 52 may further include an electronics cooler 74 coupled to the one or more conduits 60 and disposed adjacent to or within the rooftop electronics assembly 62. The electronics cooler 74 may be operable for transferring heat away from the rooftop electronics assembly 62 using the cooling fluid. The electronics cooler 74 may be a heat exchanger or the like. For example, the one or more conduits 60 may simply terminate at the electronics cooler 74 that may already be thermally coupled to the rooftop electronics assembly 62. The electronics cooler 74 and rooftop electronics assembly 62 may form a pre-assembled rooftop electronics pod, housing, or the like.

Figure 5:
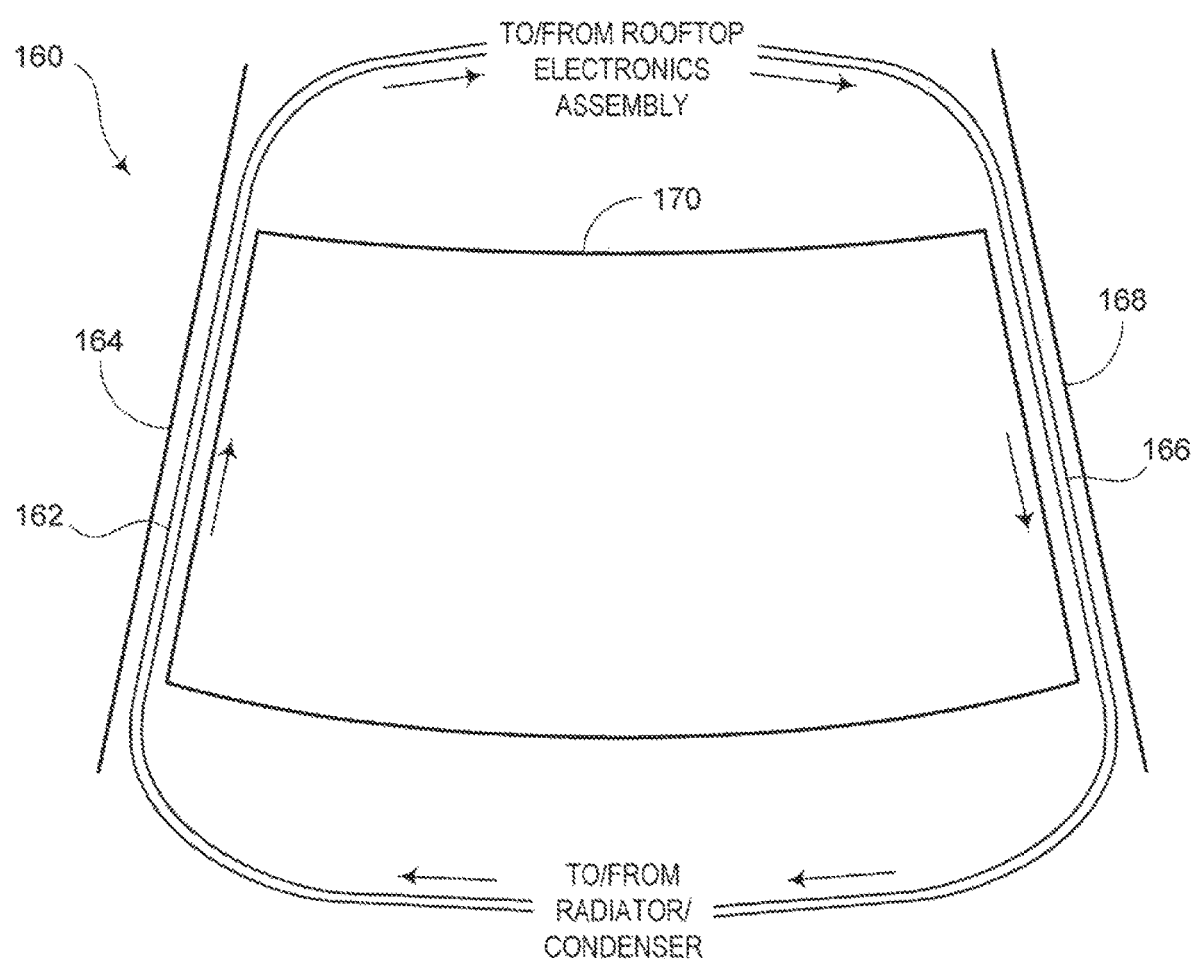
FIG. 5 is a schematic diagram illustrating a conduit routing assembly for routing cooling conduits through the two A-pillars of a vehicle, in accordance with various embodiments of the present disclosure.
Figure 6:
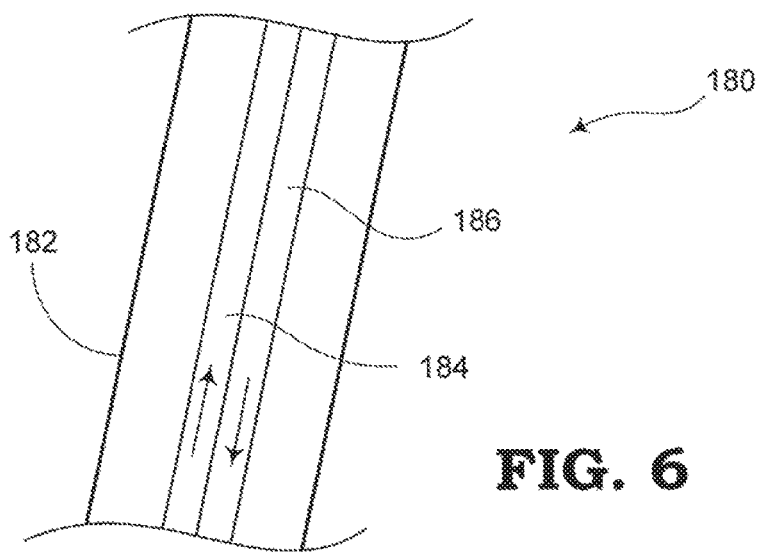
FIG. 6 is a schematic diagram illustrating a conduit routing assembly for routing cooling conduits through a single A-pillar of a vehicle, in accordance with various embodiments of the present disclosure.

Preferably, the one or more conduits 60, as described in greater detail with respect to FIGS. 5 and 6, may include both a delivery conduit configured to deliver cooled cooling fluid from the radiator 56 to the rooftop electronics assembly 62 and a return conduit configured to deliver heated cooling fluid from the rooftop electronics assembly 62 back to the radiator 56. Thus, the cooling fluid is continuously circulated through the rooftop electronics assembly 62 and continuously cooled by the radiator 56.

Figure 3:
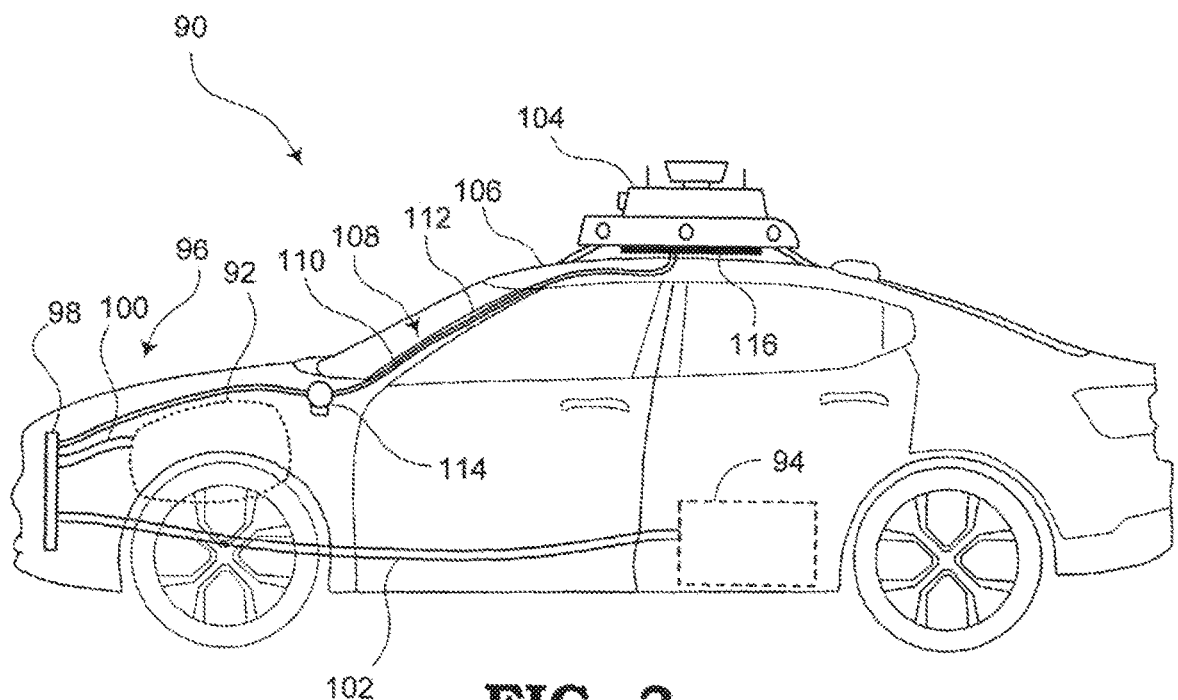
FIG. 3 is a schematic diagram illustrating a side view of a hybrid vehicle including a conduit routing assembly for routing cooling conduits from a radiator, used for cooling an internal combustion engine and battery pack for driving the hybrid vehicle, to a rooftop electronics assembly of the hybrid vehicle, in accordance with various embodiments of the present disclosure.

FIG. 3 shows a side view of an embodiment of a hybrid vehicle 90 that is driven by multiple power generating devices, including, for example, an internal combustion engine 92, a battery system 94, and/or other suitable power generating systems. In this embodiment, a heat exchanger 96 (or cooling assembly) utilizes a radiator 98 in a typical manner for cooling the internal combustion engine 92 and the battery system 94. For example, liquid coolant (not shown), which is cooled in the radiator 98, is supplied to the internal combustion engine 92 through sets of radiator hoses 100 and is supplied to the battery system 94 through additional sets of hoses 102. Heat is transferred from engine 92 and battery system 94 to the coolant circulating throughout these heat-generating components and the heated coolant returns through return hoses of the sets of hoses 100, 102 back to the radiator 98. One or more pumps (not shown) may be installed in-line with the various sets of hoses 100, 102 for forcing the coolant through the system of the heat exchanger 96.

In addition to the heat exchanger 96 cooling the engine 92 and battery system 94, the heat exchanger 96 may further be configured to cool electronic components of a rooftop electronics assembly 104 mounted on a roof 106 of the hybrid vehicle 90. The rooftop electronics assembly 104, for example, may include self-driving or autonomous systems or components, as mentioned above, which may include LiDAR, radar, cameras, and/or other suitable sensing equipment for monitoring the roads, traffic lanes, curbs, intersections, other vehicles, pedestrians, etc. surrounding the hybrid vehicle 90 to allow self-driving of the hybrid vehicle 90. The heat exchanger 96 may include a conduit routing assembly 108 configured for routing cooling conduits 110 from the radiator 98 to the rooftop electronics assembly 104. As described with respect to FIGS. 5-8, the conduit routing assembly 108 may be configured in a variety of ways.

In one aspect, the hybrid vehicle 90 and heat exchanger 96 may include one or more conduits 110 configured to transport a cooling fluid (e.g., coolant) directly or indirectly between the radiator 98 of the hybrid vehicle 90 and the rooftop electronics assembly 104. Preferably, the one or more conduits 110 may include one or more substantially flexible cooling lines forming an independent cooling loop disposed partially along/through one or more A-pillars 112 of the hybrid vehicle 90. In this configuration, the one or more conduits 110 can optionally be routed partially coincident with drain lines (not shown) of the A-pillars 112 from a sunroof (not shown) and/or other wiring.

By way of example, the one or more conduits 110 may include a nylon (e.g., polyamide) and/or stainless steel hose having an outside diameter (OD) of about 11.5 mm. The conduits 110 may be pre-shaped to enable packaging in the A-pillar 112 and may be routed between a firewall and firewall insulation and along the roof 106 of the vehicle 90. For example, the conduits 110 may further be configured to deliver a flow of about 2.5-3.0 liters per minute, when the roof 106 reaches a temperature of up to about 40 degrees C. The one or more conduits 110 may also be insulated in the A-pillar 112, if necessary.

The heat exchanger 96 may be a cooling system for otherwise cooling the engine 92, battery pack 94, and/or for cooling other electrical, mechanical, or electromechanical power generating devices. The radiator 98 may include fins, cooling coils, and other elements exposed to an external ambient air flow and may further be cooled by one or more fans (not shown) in a convection process.

The heat exchanger 96, or cooling system, may also include an additional pump 114 fluidly coupled to one or both of the conduits 110 and may be operable for transporting the cooling fluid between the radiator 98 and the rooftop electronics assembly 104. The cooling assembly or heat exchanger 96 may also include, according to some embodiments, a chiller (not shown) that further cools the cooling fluid via an air conditioning system.

The heat exchanger 96, or cooling system, may further include an electronics cooler 116 coupled to the one or more conduits 110 and disposed adjacent to or within the rooftop electronics assembly 104. The electronics cooler 116 may be operable for transferring heat away from the rooftop electronics assembly 104 using the cooling fluid or by other means. The electronics cooler 116 may be a heat exchanger, or the like. For example, the one or more conduits 110 may simply terminate at the electronics cooler 116, which may already be thermally coupled to the rooftop electronics assembly 104. The electronics cooler 116 and rooftop electronics assembly 104 may form a pre-assembled rooftop electronics housing or pod.

Preferably, the one or more conduits 110 may include both a delivery conduit configured to deliver cooled cooling fluid from the radiator 98 to the rooftop electronics assembly 104 and a return conduit configured to deliver heated cooling fluid from the rooftop electronics assembly 104 back to the radiator 98, as described in greater detail below with respect to FIGS. 5 and 6. Thus, the cooling fluid is continuously circulated through the rooftop electronics assembly 104 and continuously cooled by the radiator 98.

Figure 4:
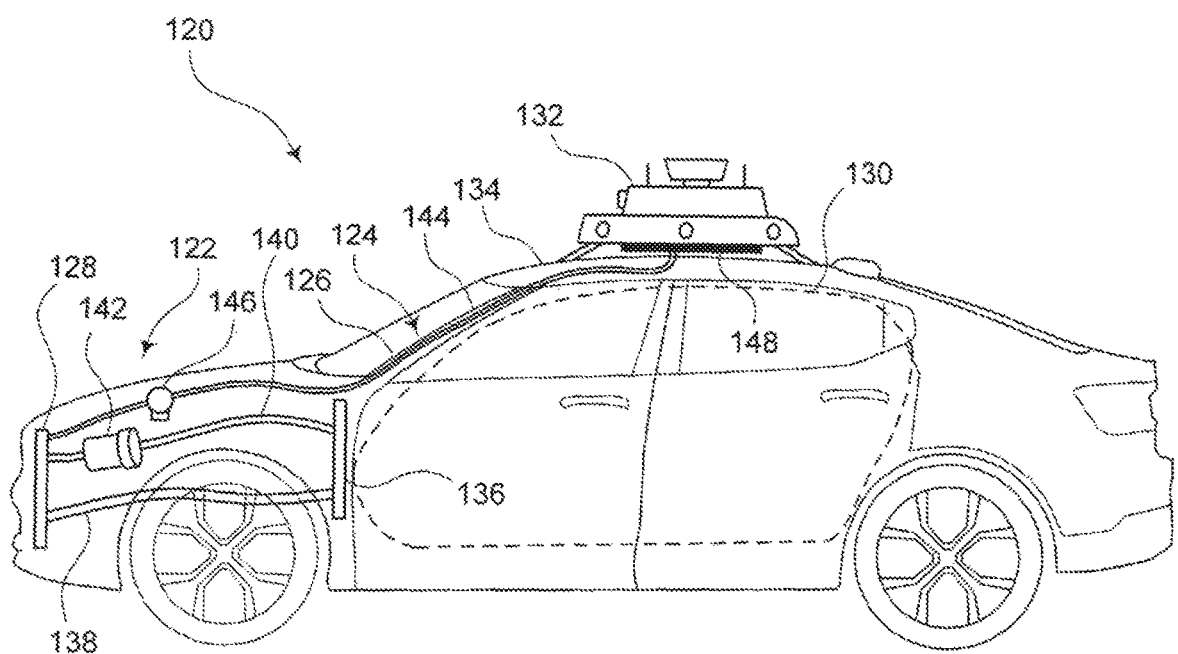
FIG. 4 is a schematic diagram illustrating a side view of a vehicle including a conduit routing assembly for routing cooling conduits from an air conditioning system, used for cooling a passenger cabin, to a rooftop electronics assembly of the vehicle, in accordance with various embodiments of the present disclosure.

FIG. 4 is a diagram showing a side view of an embodiment of a vehicle 120, which may be powered by an internal combustion engine (e.g., vehicle 10 of FIG. 1), a battery pack (e.g., electric vehicle 50 of FIG. 2), or both (e.g., hybrid vehicle 90 of FIG. 3). The vehicle 120 may include a heat exchanger 122 (or cooling assembly) configured as an air conditioning system, where the heat exchanger 122 includes a conduit routing assembly 124 for routing cooling conduits 126 from a condenser 128 of the air conditioning system, which may typically be used for cooling a passenger cabin 130, to a rooftop electronics assembly 132 mounted on a roof 134 of the vehicle 120.

In this embodiment, the heat exchanger 122 (e.g., air conditioning system) utilizes the condenser 128, which may be arranged at the front of the vehicle 120 and may be positioned in front of the radiator (e.g., radiator 16, 56, 98), behind the radiator, or adjacent to the radiator. The heat exchanger 122 or AC system may be used in a typical manner for cooling the passenger cabin 130. For example, compressed air (not shown), which is cooled by the condenser 128, is supplied to an evaporator 136 through a first set of hoses 138. Heat from the evaporator 136 is transferred back to the condenser 128 by way of another set of hoses 140 and a compressor 140. In some embodiments, the compressor 140 may alternatively be installed in-line with the first set of hoses 138.

In addition to utilizing the heat exchanger 122 to cool the passenger cabin 130, the heat exchanger 122 may be configured such that the conduit routing assembly 124 further supplies cooled air from the condenser 128 to also cool electronic components of the rooftop electronics assembly 132. The rooftop electronics assembly 132, for example, may include self-driving or autonomous systems or components, as mentioned above. The conduit routing assembly 124 is configured for routing the cooling conduits 126 from the condenser 128 to the rooftop electronics assembly 132 by one of any various means, as described with respect to FIGS. 5-8.

In one aspect, the vehicle 120 and heat exchanger 122 may include one or more conduits 126 configured to transport a cooling fluid (e.g., refrigerated air) directly or indirectly between the condenser 128 of the vehicle 120 and the rooftop electronics assembly 132. Preferably, the one or more conduits 126 may include one or more substantially flexible cooling lines forming an independent cooling loop disposed partially along/through one or more A-pillars 144 of the vehicle 120. In this configuration, the one or more conduits 126 can optionally be routed partially coincident with drain lines (not shown) of the A-pillars 144 from a sunroof (not shown) and/or other wiring.

By way of example only, the one or more conduits 126 may include a nylon (e.g., polyamide) and/or stainless steel hose having an outside diameter (OD) of about 11.5 mm. The conduits 126 may be pre-shaped to enable packaging in the A-pillar 144 and may be routed between a firewall and firewall insulation and along the roof 134 of the vehicle 120. The one or more conduits 126 may also be insulated in the A-pillar 144.

The heat exchanger 122 may be a cooling system for otherwise cooling the passenger cabin 130 or for cooling or refrigerating other spaces/areas of the vehicle 120 or for cooling various vehicle components configured to perform various functions that may generate heat as a byproduct. The condenser 128, like the radiator 16, 56, 98, may also include fins, cooling coils, and other elements exposed to an external air flow and may further be cooled by one or more fans for displacing heat by convection.

The heat exchanger 122, or air conditioning system, may also include an additional pump or compressor 146 fluidly or pneumatically coupled to one or both of the conduits 126 and may be operable for transporting the cooling fluid (e.g., refrigerated air) between the condenser 128 and the rooftop electronics assembly 132. The heat exchanger 122 may also include a chiller (not shown) or other additional air conditioning components for refrigerating air that can be coupled with the conduits 126.

The heat exchanger 122 may further include an electronics cooler 148 coupled to the one or more conduits 126 and disposed adjacent to or within the rooftop electronics assembly 132. The electronics cooler 148 may be operable for transferring heat away from the rooftop electronics assembly 132 using the cooling fluid or by other means. The electronics cooler 148 may be a heat exchanger, or the like. For example, the one or more conduits 126 may simply terminate at the electronics cooler 148, which may already be thermally coupled to the rooftop electronics assembly 132. The electronics cooler 148 and rooftop electronics assembly 132 may form a pre-assembled rooftop electronics housing or pod.

Preferably, the one or more conduits 126 may include both a delivery conduit configured to deliver cooled cooling fluid (e.g., refrigerated air) from the condenser 128 to the rooftop electronics assembly 132 and a return conduit configured to deliver heated cooling fluid from the rooftop electronics assembly 132 back to the condenser 128. Thus, the cooling fluid is continuously circulated through the rooftop electronics assembly 132 and is continuously cooled by the condenser 128.

FIG. 5 is a schematic diagram illustrating a first embodiment of a conduit routing assembly 160, which may correspond, for example, to one or more of the conduit routing assemblies 28, 54, 108, 124 described above with respect to FIGS. 1-4. In this regard, the conduit routing assembly 160 may include conduits for transporting liquid coolant, as described with respect to the embodiments of FIGS. 1-3, and/or for transporting gaseous refrigerant, as described with respect to the embodiment of FIG. 4.

The conduit routing assembly 160 is configured for routing at least a first cooling conduit 162 through a first A-pillar 164 of a vehicle and routing at least a second cooling conduit 166 through a second A-pillar 168. The A-pillars 164, 168 may be configured, among other things, to hold a windshield 170 in place. The first and second cooling conduits 162, 166 may correspond to conduits 30, 60, 110, or 126 described with respect to FIGS. 1-4, respectively. The first cooling conduit 162 may be configured for moving fluid (e.g., liquid coolant or refrigerated air) from the radiator 16, 56, 98 or condenser 128 to the rooftop electronics assembly 24, 62, 104, 132. The second cooling conduit 166 may be configured for moving heated fluid (e.g., liquid coolant or refrigerated air) from the rooftop electronics assembly 24, 62, 104, 132 back to the radiator/condenser. In some embodiments, the direction of fluid flow as shown in FIG. 5 may be reversed, whereby the fluid is forced up through one or more conduits in or along the second A-pillar 168 and returns down through one or more conduits in or along the first A-pillar 164.

FIG. 6 is a schematic diagram illustrating a second embodiment of a conduit routing assembly 180 for routing cooling conduits through a single A-pillar 182 of a vehicle. The conduit routing assembly 180 may correspond, for example, to one or more of the conduit routing assemblies 28, 54, 108, 124 described above with respect to FIGS. 1-4. In this regard, the conduit routing assembly 180 may include conduits for transporting liquid coolant, as described with respect to the embodiments of FIGS. 1-3, and/or for transporting gaseous refrigerant, as described with respect to the embodiment of FIG. 4. The A-pillar 182 in this embodiment may be either the right A-pillar or the left A-pillar of the vehicle.

The conduit routing assembly 180 may be configured for routing a first cooling conduit 184 through the A-pillar 182 of a vehicle and routing a second cooling conduit 186 through the same A-pillar 182. For example, the first cooling conduit 184 may be configured for moving fluid (e.g., liquid coolant or refrigerated air) from the radiator 16, 56, 98 or condenser 128 to the rooftop electronics assembly 24, 62, 104, 132. The second cooling conduit 186 may be configured for moving heated fluid (e.g., liquid coolant or refrigerated air) from the rooftop electronics assembly 24, 62, 104, 132 back to the radiator/condenser.

In this embodiment, the conduits 184, 186 may be insulated from each other to prevent thermal exchange. In other embodiments, however, the conduits 184, 186 may be configured in a counter-current exchange, whereby heat from the heated fluid within the returning conduit 186 can be thermally transferred to the fluid flowing through the supply conduit 184. In this respect, the conduits 184, 186 may be formed as one component, at least along the path through the A-pillar 182 where the conduits 184, 186 are arranged side by side, and therefore may include a thermally conductive barrier between them to allow heat transfer while allowing fluid flow in opposite directions.

Figure 7:
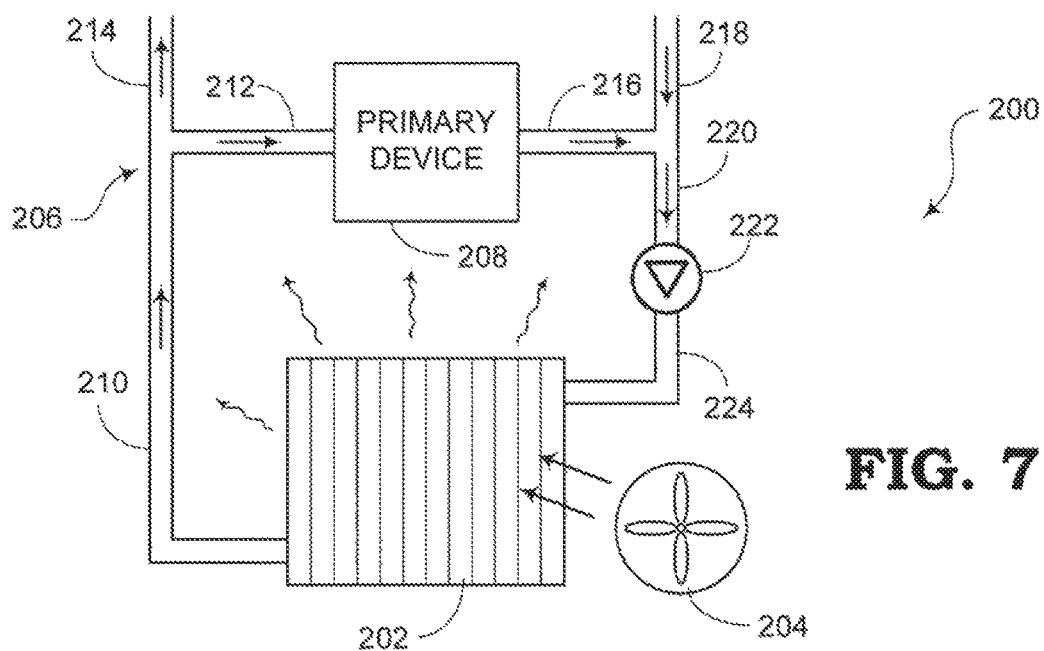
FIG. 7 is a schematic diagram illustrating a heat exchanger system utilizing one or more of the heat exchangers and conduit routing assemblies shown in FIGS. 1-4 for routing cooling conduits from the heat exchanger to the rooftop electronics assembly in parallel with conduits leading to primary components to be cooled in the vehicle, in accordance with various embodiments of the present disclosure.

FIG. 7 is a schematic diagram illustrating an embodiment of a cooling system 200. The cooling system 200 includes a heat exchanger 202, which may be configured as a radiator, condenser, or other cooling device. One or more fans 204 may be used to help disperse heat from the heat exchanger 202 into the ambient air. The cooling system 200 may represent any one or more of the heat exchangers 14, 52, 96, 122 shown in FIGS. 1-4 and may utilize any of the conduit routing assemblies 28, 54, 108, 124 shown in FIGS. 1-4 for routing cooling conduits from the radiator 16, 56, 98 or condenser 128 to the rooftop electronics assembly (not shown in FIG. 7). Also, the conduits may be routed through one or more A-pillar, in the manner described with respect to FIGS. 5 and 6. A conduit routing assembly 206 shown in FIG. 7 includes conduits for cooling at least one primary device 208 (e.g., engine 12, 92, battery system 58, 94, and/or other power generating devices) and also includes conduits arranged in parallel with the primary conduits for additionally cooling the rooftop electronics assembly.

The conduit routing assembly 206 of the cooling system 200 of FIG. 7 includes an outlet conduit 210 that exits the heat exchanger 202 and is configured to transport cooled fluid (e.g., liquid coolant or refrigerated air) that has been cooled by the heat exchanger 202. The conduit 210, in this parallel arrangement of FIG. 7, includes a first supply conduit 212 that leads to the primary device 208 and a second supply conduit 214 that leads to the rooftop electronics assembly. An outlet conduit 216 from the primary device 208 joins an outlet conduit 218 from the rooftop electronics assembly to transport heated fluid through a joining conduit 220. A pump 222 receives the heated fluid from the joining conduit 220 and forces the fluid (e.g., liquid or air) through an inlet conduit 224 leading back into the heat exchanger 202. In this regard, fluid is supplied equally to at least two different systems (i.e., the primary devices 208 and rooftop electronics assembly) with parallel conduit paths, such that each branch may receive cooled fluid equally. In other embodiments, the conduits 212, 214 (and conduits 216, 218) may include different sizes of tubing in order that different amounts of fluid can be transported to the various components to be cooled.

Figure 8:
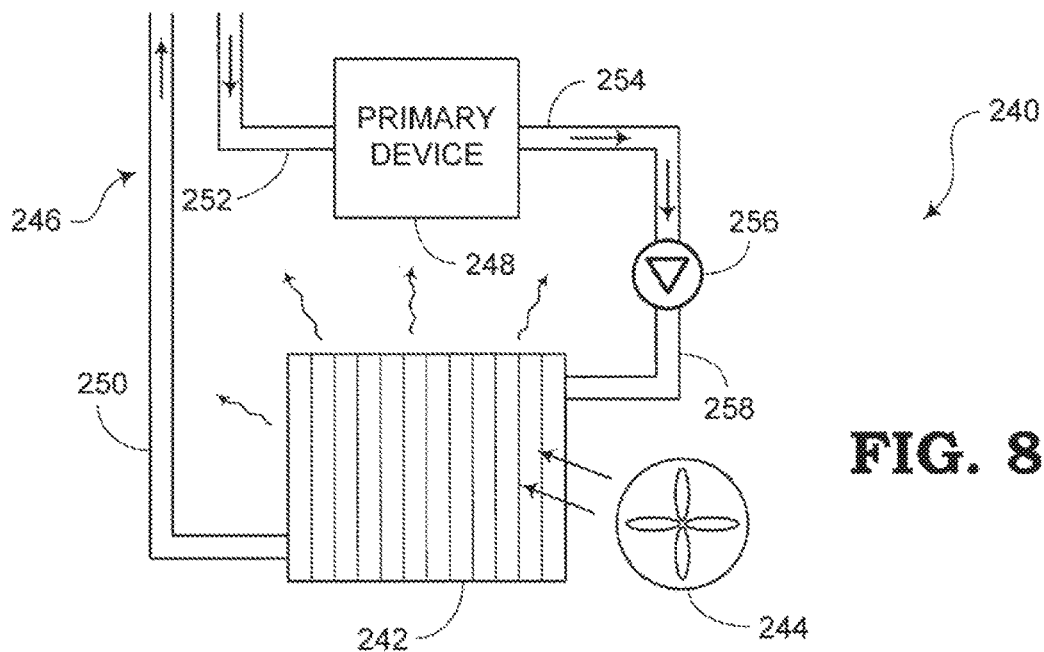
FIG. 8 is a schematic diagram illustrating a heat exchanger system utilizing one or more of the heat exchangers and conduit routing assemblies shown in FIGS. 1-4 for routing cooling conduits from the heat exchanger to the rooftop electronics assembly in series with conduits leading to primary components to be cooled in the vehicle, in accordance with various embodiments of the present disclosure.

FIG. 8 is a diagram illustrating another embodiment of a cooling system 240 used for cooling a rooftop electronics assembly (not shown) in conjunction with the cooling of one or more other primary components. The cooling system 240 includes a heat exchanger 242, which may be configured as a radiator, condenser, or other cooling device. One or more fans 244 may be used to help disperse heat from the heat exchanger 242 into the ambient air. The cooling system 240 may represent any one or more of the heat exchangers 14, 52, 96, 122 shown in FIGS. 1-4 and may utilize any of the conduit routing assemblies 28, 54, 108, 124 shown in FIGS. 1-4 for routing cooling conduits from the radiator 16, 56, 98 or condenser 128 to the rooftop electronics assembly. Also, the conduits may be routed through one or both A-pillars in the manner described with respect to FIGS. 5 and 6. A conduit routing assembly 246 shown in FIG. 8 includes series-connected conduits for cooling at least one primary device 248 (e.g., engine 12, 92, battery system 58, 94, and/or other power generating device) and for cooling the rooftop electronics assembly.

The conduit routing assembly 246 of the cooling system 240 of FIG. 8 includes an outlet conduit 250 that exits the heat exchanger 242 and is configured to transport cooled fluid (e.g., liquid coolant or refrigerated air) that has been cooled by the heat exchanger 202. The conduit 250, in this series arrangement of FIG. 8, leads directly to the rooftop electronics assembly. An outlet conduit 252 from the rooftop electronics assembly transports fluid that may be at least partially heated by the rooftop electronics assembly. The outlet conduit 252 may also be configured as an inlet to the at least one primary device 248 for also cooling the primary device(s) 252. Heated fluid from the primary device 248 flows through a conduit 254 to a pump 256, which pumps the fluid through the heat exchanger 242 via an inlet conduit 258. In an alternative embodiment, the series connection of conduits of FIG. 8 may instead include conduits that lead from the heat exchanger 242 to the at least one primary device 248 first and then, after cooling the at least one primary device 248, the fluid flows from the primary device 248 through the rooftop electronics assembly for cooling of the rooftop electronics assembly.

Figure 9:
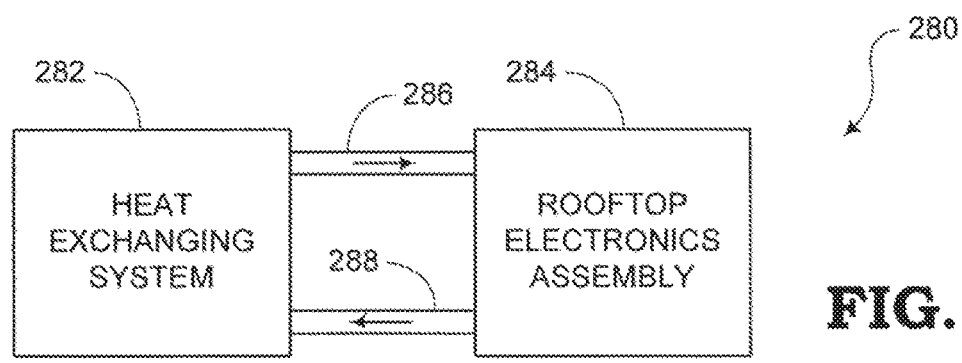
FIG. 9 is a schematic diagram illustrating a cooling system utilized separately from the heat exchangers shown in FIGS. 1-4 for directly routing cooling conduits from a heat exchanging system to the rooftop electronics assembly, in accordance with various embodiments of the present disclosure.

FIG. 9 is a schematic diagram illustrating a cooling system 280, which includes separate or dedicated heat exchanging system 282 that may be utilized separately from the primary heat exchangers 14, 52, 96, 122, 202, 242 shown in FIGS. 1-4, 7, and 8. Thus, instead of use with other primary devices, the cooling system 280 of FIG. 9 is configured for directly routing cooling conduits from the heat exchanging system 282 to the rooftop electronics assembly 284. In this system, there are no other primary devices 208, 248 that share the cooling capacities of the heat exchanging system 282. Thus, a first supply conduit 286 can be used to supply cooling fluid (e.g., liquid coolant or refrigerated air) from the heat exchanging system 282 directly to the rooftop electronics assembly 284. Also, return conduit 288 is used for returning the heated fluid from the rooftop electronics assembly 284 directly back to the heat exchanging system 282.

According to the embodiment of FIG. 9, the heat exchanging system 282 may be positioned at any location within a vehicle (e.g., vehicle 10, 50, 90, 120), such as under the hood of the vehicle, in a trunk, under the body of the vehicle, etc. The conduits 286, 288 therefore may pass up through one or both of the A-pillars of the vehicle (or through one or both of the one or more sets of B-pillars, C-pillars, D-pillars, etc.). The heat exchanging system 282 may include a pump or other component for forcing cooled fluid to the rooftop electronics assembly 284 through the supply conduit 286 and from the rooftop electronics assembly 284 through the return conduit 288.

Although the present disclosure is illustrated and described herein with reference to preferred aspects and specific examples thereof, it will be readily apparent to those of ordinary skill in the art that other aspects and examples may perform similar functions and/or achieve like results. All such equivalent aspects and examples are within the spirit and scope of the present disclosure, are contemplated thereby, and are intended to be covered by the following non-limiting claims for all purposes.

What is claimed is:

1. An assembly for cooling a rooftop electronics assembly of a vehicle, comprising:
   one or more conduits configured to transport a cooling fluid between an in-vehicle cooling system and the rooftop electronics assembly, wherein the one or more conduits are disposed at least partially along an A-pillar of the vehicle, and wherein the one or more conduits comprise a delivery conduit configured to deliver cooled cooling fluid from the in-vehicle cooling system to the rooftop electronics assembly and a return conduit configured to deliver heated cooling fluid from the rooftop electronics assembly to the in-vehicle cooling system.

2. The assembly of claim 1, further comprising a pump fluidly coupled to the one or more conduits and operable for transporting the cooling fluid between the in-vehicle cooling system and the rooftop electronics assembly.

3. The assembly of claim 1, further comprising an electronics cooler coupled to the one or more conduits, disposed adjacent to or within the rooftop electronics assembly, and operable for transferring heat away from the rooftop electronics assembly using the cooling fluid.

4. The assembly of claim 1, wherein the in-vehicle cooling system comprises a radiator disposed in an engine or motor compartment of the vehicle.

5. The assembly of claim 1, wherein the in-vehicle cooling system comprises a heat exchanger.

6. A vehicle comprising a cooling assembly for cooling a rooftop electronics assembly of the vehicle, the cooling assembly comprising one or more conduits configured to transport a cooling fluid between an in-vehicle cooling system of the vehicle and the rooftop electronics assembly, wherein the one or more conduits are disposed partially along an A-pillar of the vehicle, and wherein the one or more conduits comprise a delivery conduit configured to deliver cooled cooling fluid from the in-vehicle cooling system to the rooftop electronics assembly and a return conduit configured to deliver heated cooling fluid from the rooftop electronics assembly to the in-vehicle cooling system.

7. The vehicle of claim 6, wherein the cooling assembly further comprises a pump fluidly coupled to the one or more conduits and operable for transporting the cooling fluid between the in-vehicle cooling system and the rooftop electronics assembly.

8. The vehicle of claim 6, wherein the cooling assembly further comprises an electronics cooler coupled to the one or more conduits, disposed adjacent to or within the rooftop electronics assembly, and operable for transferring heat away from the rooftop electronics assembly using the cooling fluid.

9. The vehicle of claim 6, wherein the in-vehicle cooling system comprises a radiator disposed in an engine or motor compartment of the vehicle.

10. The vehicle of claim 6, wherein the in-vehicle cooling system comprises a heat exchanger.

11. A cooling system of a vehicle, the cooling system comprising:
    a heat exchanger in fluid communication with a coolant supply conduit and a coolant return conduit; and
    a conduit routing assembly configured to route the coolant supply conduit and coolant return conduit through one or more A-pillars of the vehicle for transporting cooling fluid between the heat exchanger and a rooftop electronics assembly mounted on the roof of the vehicle.

12. The cooling system of claim 11, wherein the heat exchanger includes a radiator.

13. The cooling system of claim 12, wherein the radiator is further configured to cool one or more of an internal combustion engine and a battery pack.

14. The cooling system of claim 11, wherein the heat exchanger includes an air conditioning system.

15. The cooling system of claim 14, wherein the air conditioning system is further configured to cool a passenger cabin of the vehicle.

16. The cooling system of claim 11, wherein the coolant supply conduit is arranged in a first A-pillar of the one or more A-pillars and the coolant return conduit is arranged in a second A-pillar of the one or more A-pillars.

17. The cooling system of claim 11, wherein the coolant supply conduit and coolant return conduit are arranged in a single A-pillar of the one or more A-pillars.

18. The cooling system of claim 11, wherein the coolant supply conduit branches into a first conduit and a second conduit, the first conduit leading to a primary device to be cooled by the heat exchanger and the second conduit leading to the rooftop electronics assembly, wherein the coolant return conduit branches into a third conduit and a fourth conduit, the third conduit leading from the rooftop electronics assembly to the heat exchanger and the fourth conduit leading from the primary device to the heat exchanger, and wherein the primary device is one or more of an internal combustion engine, a battery pack, and a passenger cabin.

19. The cooling system of claim 11, wherein the coolant supply conduit leads to the rooftop electronics assembly and the coolant return conduit passes from the rooftop electronics assembly through a primary device to the heat exchanger, and wherein the primary device is one or more of an internal combustion engine, a battery pack, and a passenger cabin.

20. The cooling system of claim 11, wherein the rooftop electronics assembly includes equipment for sensing information related to an environment around the vehicle, and wherein the information is used to enable the vehicle to perform self-driving actions.

* * * * *